(12) United States Patent
Huang et al.

(10) Patent No.: US 11,263,434 B2
(45) Date of Patent: Mar. 1, 2022

(54) FAST SIDE-FACE INTERFERENCE RESISTANT FACE DETECTION METHOD

(71) Applicant: SOUTH CHINA UNIVERSITY OF TECHNOLOGY, Guangdong (CN)

(72) Inventors: Han Huang, Guangdong (CN); Zilong Li, Guangdong (CN); Zhifeng Hao, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 15 days.

(21) Appl. No.: 16/979,186

(22) PCT Filed: Nov. 15, 2018

(86) PCT No.: PCT/CN2018/115770
§ 371 (c)(1),
(2) Date: Sep. 9, 2020

(87) PCT Pub. No.: WO2019/169895
PCT Pub. Date: Sep. 12, 2019

(65) Prior Publication Data
US 2020/0410212 A1  Dec. 31, 2020

(30) Foreign Application Priority Data
Mar. 9, 2018  (CN) .......................... 201810194209.4

(51) Int. Cl.
*G06K 9/00* (2006.01)
*G06K 9/46* (2006.01)
(Continued)

(52) U.S. Cl.
CPC ..... *G06K 9/00248* (2013.01); *G06K 9/00281* (2013.01); *G06K 9/00288* (2013.01);
(Continued)

(58) Field of Classification Search
CPC ........... G06K 9/00248; G06K 9/00288; G06K 9/4609; G06K 9/627; G06K 9/00281; G06N 3/08
See application file for complete search history.

(56) References Cited

U.S. PATENT DOCUMENTS

2004/0066966 A1\* 4/2004 Schneiderman ..... G06K 9/6857
382/159
2006/0147093 A1\* 7/2006 Sanse ..................... B42D 25/00
382/115

FOREIGN PATENT DOCUMENTS

CN          5512620       4/2016
CN        106096535      11/2016
(Continued)

OTHER PUBLICATIONS

"International Search Report (Form PCT/ISA/210) of PCT/CN2018/115770", dated Feb. 15, 2019, with English translation thereof, pp. 1-4.

*Primary Examiner* — Ruiping Li
(74) *Attorney, Agent, or Firm* — JCIPRNET

(57) ABSTRACT

Disclosed is a fast side-face interference resistant face detection method, in which a user selects an ordinary image, uses a deep neural network to extract image features, and then determines an exact location of a face. A training method for face detection uses a pure data-driven manner, uses an ordinary face image and a face boundary box as inputs, uses mirror symmetry and Gaussian filtering to perform data augmentation, and uses migration learning and hard example mining to enhance training effects. After a face image is read, the image is firstly scaled, and then placed into the deep neural network to extract features, and generate a plurality of face likelihood boxes and confidence scores of the face likelihood boxes, and finally the most appropriate face likelihood box is selected in a non-maximum suppres- (Continued)

sion manner. No specific requirements are set on an angle of the face image, and a detection effect of a side face is still very obvious. In addition, the detection method above is simple, employs an end-to-end detection manner, and can be applied to a real-time environment.

8 Claims, 1 Drawing Sheet

(51) Int. Cl.
 *G06K 9/62* (2006.01)
 *G06N 3/08* (2006.01)
(52) U.S. Cl.
 CPC .......... *G06K 9/4609* (2013.01); *G06K 9/627* (2013.01); *G06N 3/08* (2013.01)

(56) References Cited

FOREIGN PATENT DOCUMENTS

| CN | 107491726 | 12/2017 |
| CN | 108446617 | 8/2018 |

* cited by examiner

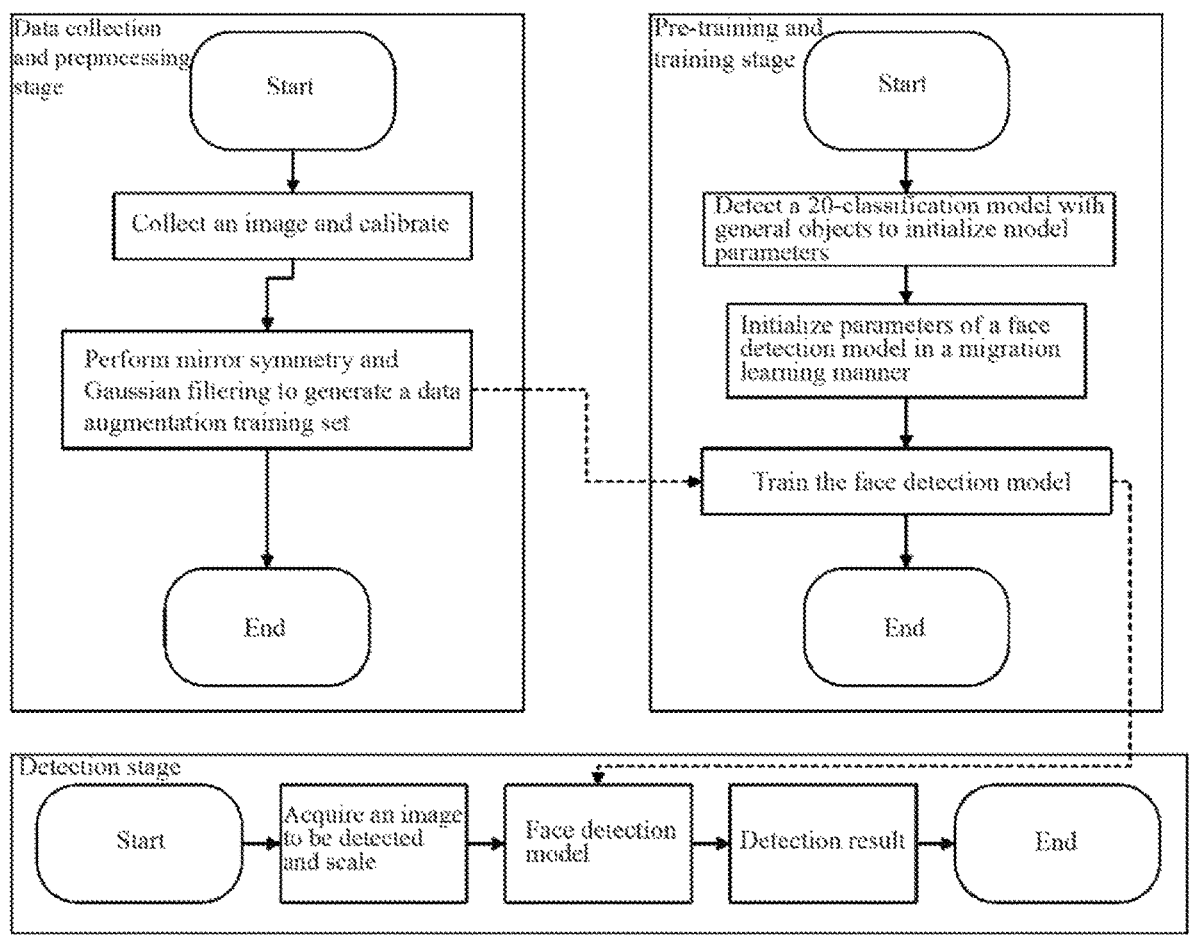

FAST SIDE-FACE INTERFERENCE RESISTANT FACE DETECTION METHOD

CROSS-REFERENCE TO RELATED APPLICATION

This application is a 371 of international application of PCT application serial no. PCT/CN2018/115770, filed on Nov. 15, 2018, which claims the priority benefit of China application no. 201810194209.4, filed on Mar. 9, 2018. The entirety of each of the above mentioned patent applications is hereby incorporated by reference herein and made a part of this specification.

TECHNICAL FIELD

The present invention belongs to the field of computer intelligent surveillance video processing technologies, and relates to a fast side-face interference resistant face detection method.

BACKGROUND

Surveillance videos, as the core portion of the intelligent surveillance system, have been paid much attention. With the increasing call for constructing a complete public security system, surveillance cameras in cities start to be greatly increased. With existing human resources, it will waste a lot of time to search the surveillance videos of more than a dozen routes and even search in massive video libraries only by manpower. Therefore, the automation of video surveillance, the full exertion of an autonomy and a real-time property of the video surveillance, and the liberation of manual labor play vital roles in a security field and even in the improvement of a living standard of people. Many automatic/semi-automatic algorithms emerge at the right moment to meet the needs of assistance, and even automatic retrieval or surveillance video shooting.

However, current detection algorithms in the world, such as the face detection algorithms, are difficult to meet the needs of the market, which often cannot effectively solve the problems of blurring, shielding, an excessively small face, or an excessively slow detection speed when facing a face detection task. The present invention has a fast processing speed and a high detection rate, and it can fully solve the problems of blurring, shielding and an excessively small face, and is able to effectively assist works of security personnel.

SUMMARY

Aiming at the defects in existing face detection methods, the present invention provides a fast side-face interference resistant face detection method, which can effectively overcome the problems of face shielding, an excessively small face, and blurring that lead to the failure of the face detection, and uses the convolutional neural network and the parameter sharing strategy, thus greatly improving the detection speed. In order to achieve the above objective, the technical solutions used in the present invention are as follows.

A fast side-face interference resistant face detection method according to the present invention comprises a data collection and preprocessing stage, a pre-training and training stage and a detection stage, and specific steps are as follows:

(a) data collection and preprocessing stage: collecting face images in the practical application scene, and calibrating the collected face images to generate an original training set;

(b) data collection and preprocessing stage: performing mirror symmetry and Gaussian filtering operation on the face images collected in the step (a) to generate a comprehensive augmentation training set;

(c) pre-training and training stage: using images of non-face ordinary objects with M classifications as data to pre-train a multi-classification model for object detection by SoftMax Loss or log-likehood loss;

(d) pre-training and training stage: using model parameters obtained by training in the step (c) to initialize some parameters of a face detection model in a migration learning manner and changing the original network model into the binary classification model;

(e) pre-training and training stage: using the comprehensive augmentation training set obtained in the step (b) as the input training set to obtain a model to be used in the detection stage by training, wherein the training employs an end-to-end manner, and comprises functions of candidate region extraction, face detection feature extraction and feature classification; and (f) testing stage: the face detection method is capable of conveniently adjusting a scale of an input image during testing to meet requirements on an accuracy, resource consumption and a detection time.

As a preferred technical solution, the step (a) comprises the following steps:

(a-1) using the face image collected in the step (a), and using a rectangular box to calibrate a face in the face image, wherein the rectangular box is required to go up to a highest point of a hairline on a forehead, down to a lowest point of a chin, and left and right to a cheek when calibrating; and (a-2) recording a location (x0, y0) of an upper left corner point of the rectangular box in the image and a width and a height (w, h) of the rectangular box, and obtaining a coordinate (x1, y1) of a lower right corner of the rectangular box, wherein x1=x0+w and y1=y0+h.

As a preferred technical solution, the step (b) comprises the following steps:

(b-1) performing mirror symmetry on the face image calibrated in the step (a), and setting a coordinate of an upper left corner of an originally calibrated box as (x0, y0) and a coordinate of a lower right corner of the originally calibrated box as (x1, y1), and the face image having a width of W and a height of H, then the coordinate of the upper left corner of the calibrated box subjected to the mirror symmetry is (x'0=W-x'0, y'0=y0), and the coordinate of the lower right corner of the calibrated box subjected to the mirror symmetry is (x'1=W-x'1, y'1=y0), and obtaining a mirror augmentation training set;

(b-2) performing Gaussian filtering on the mirror augmentation training set obtained in the step (b-1) to obtain a Gaussian filtering augmentation training set, wherein a size of a convolution kernel is 9*9 and a sigma value is 5; and (b-3) integrating the mirror augmentation training set obtained in the step (b-1) with the Gaussian filtering augmentation training set obtained in the step (b-2), and performing data screening artificially during integrating:

A. for a single face image, using a majority voting manner on the single face image, if two people think that the single face image is a face image, keeping the single face image; otherwise, deleting the single face image; and finally, using all the kept images as a comprehensive augmentation training set; and B. for a multi-face image, if the multi-face image is considered having a face but is not marked, removing the multi-face image artificially, and finally, using all the kept images as the comprehensive augmentation training set.

As a preferred technical solution, the step (c) comprises the following steps:

(c-1) using images of the non-face ordinary objects with 20 classifications as pre-training data;

(c-2) training a pre-training data set by ResNet-50, and adjusting the classifications from 1000 to 21, wherein 20 classifications are the above ordinary objects and 1 classification is a background; and (c-3) in order to fully converge the pre-training model, using a strategy of "multistep" for training, wherein a step size of a first step is 200,000, a step size of a second step is 400,000, and a total number of iterations is 800,000.

As a preferred technical solution, the step (d) comprises the following steps:

(d-1) using the model obtained by pre-training in the step (c) to initialize some parameters of the face detection model in the migration learning manner; and (d-2) using a region-based fully convolutional network as a main frame for training, and modifying a classification number of the frame to be 2 classifications.

As a preferred technical solution, the step (e) comprises the following steps:

(e-1) using the whole face image as a training image, and using the training image together with a corresponding face rectangular box coordinate as inputs of the network;

(e-2) defining a structure of the network, wherein the whole network comprises a likelihood window extraction sub-network and a region-based fully convolutional network; and (e-3) employing an end-to-end multi-task training manner, and using a hard example mining manner to obtain a complete face detection model by training.

As a preferred technical solution, in the step (e-2):

the likelihood window extraction sub-network is used for extracting a face likelihood region from an image to be detected, specifically, each location of a last convolution layer is mapped back to an original image region in a combination manner of three scales and three length-width ratios, wherein the three scale areas are respectively [128*128, 256*256, 512*512], and the three length-width ratios are respectively [1:1, 1:2, 2:1], and the image region mapped in the manner is able to cover all target regions of the original image; and the region-based fully convolutional network is used for judging whether a candidate region provided by RPN is a face and further adjusting a location of the face.

As a preferred technical solution, the step (f) comprises the following steps:

(f-1) inputting scale parameters during testing, which comprise a minimum scaling edge interface and a maximum scaling edge interface; and (f-2) automatically scaling, by the algorithm, the inputted images to a suitable size according to the inputted scale parameters, classifying the scaled inputted images, and outputting location information and class information.

Compared with the prior art, the present invention has the following advantages and beneficial effects.

1. After a face image is read, the image is firstly scaled, and then placed into the deep neural network to extract features, and generate a plurality of face likelihood boxes and confidence scores of the face likelihood boxes, and finally the most appropriate face likelihood box is selected in a non-maximum suppression manner.

2. The fast side-face interference resistant face detection method provided by the present invention selects a main face region (going up to the highest point of the hairline, down to the lowest point of the chin, and left and right to a boundary of an ear and the cheek) as a detection target, and artificially augments training images by the mirror symmetry and the Gaussian filtering, so that the problems of face shielding, an excessively small face, and blurring that lead to failure of face detection can be solved to a great extent.

3. The present invention has no specific requirements on an angle of the face image, and a detection effect of a side face is still very obvious.

4. The detection method according to the present invention is simple, employs an end-to-end detection manner, and can be applied to a real-time environment.

BRIEF DESCRIPTION OF THE DRAWINGS

FIG. 1 is a whole flow chart of a fast side-face interference resistant face detection method according to the present invention.

DETAILED DESCRIPTION

The present invention is further described in detail hereinafter with reference to the embodiments and the accompanying drawings, but the embodiments of the present invention are not limited to this.

Embodiment

A fast side-face interference resistant face detection method in this embodiment comprises a data collection and preprocessing stage, a pre-training and training stage and a detection stage.

In the data collection and preprocessing stage, face images in the practical application scene is collected first and a face part in the image is marked, and then mirror symmetry and Gaussian filtering are performed on these face samples to generate an augmentation training set.

Model training comprises two steps: 1) using an image of a common 20-classification object as training inputs, and training a 21-classification (the extra classification is a background) model by SoftMax Loss as a pre-training model; and 2) using model parameters obtained by pre-training in the step (1) to initialize some parameters of a face detection model in a "migration learning" manner and changing a classifier into 2 classifications (one classification is a face and the other classification is the background). As a model used in a final stage, the face detection model employs an end-to-end training manner, and comprises functions of face likelihood extraction, face feature extraction and feature classification.

As shown in FIG. 1, the main steps of this embodiment are as follows.

(a) In the data collection and preprocessing stage, face images in the practical application scene are collected, and the collected face images are calibrated to generate an original training set.

The step (a) belongs to the data collection and preprocessing stage, and is mainly intended to collect and calibrate data to generate the original training set. A rectangular box calibration method used in the step (a) is simple and easy to use, reduces manpower consumption, and is easy to perform data augmentation and other features in step (b).

The step (a) comprises the following steps.

In (a-1), the data collected in the 1 (a) is used, and a rectangular box is used to calibrate a face in the image, wherein the rectangular box is required to go up to a highest point of a hairline on a forehead, down to a lowest point of a chin, and left and right to a cheek.

In (a-2), a location (x0, y0) of an upper left corner point of the rectangular box in the image and a width and a height (w, h) of the rectangular box are recorded, and then a coordinate (x1, y1) of a lower right corner of the rectangular box is obtained, wherein x1=x0+w and y1=y0+h.

(b) In the data collection and preprocessing stage: mirror symmetry and Gaussian filtering are performed on the original training set to generate a comprehensive augmentation training set.

The step (b) belongs to the data collection and preprocessing stage, and is mainly intended to augment the data collected and calibrated in the step (a) by the mirror symmetry and the Gaussian filtering to solve problems of insufficient training data and less fuzzy data. The Gaussian filtering is linear smoothing filtering. Generally speaking, the Gaussian filtering is a process of performing weighted average on the whole image, and a value of each pixel is obtained by performing weighted average on the value thereof and other pixel values in a neighborhood. Specific operation of the Gaussian filtering is that: every pixel in the image is scanned with a convolution, and a value of a convolution center pixel is replaced with a weighted average gray value of the pixel in the neighborhood determined by the convolution.

The step (b) comprises the following steps.

In (b-1), the mirror symmetry is performed on the image and face calibration in the original training set generated in the step a. In the original training set, a coordinate of an upper left corner of a calibrated box is set as (x0, y0) and a coordinate of a lower right corner of the calibrated box is set as (x1, y1), and the image has a width of W and a height of H. The coordinate of the upper left corner of the calibrated box subjected to the mirror symmetry is (x'0=W-x'0, y'0=y0), and the coordinate of the lower right corner of the calibrated box subjected to the mirror symmetry is (x'1=W-x'1, y' 1=y0), and then a mirror augmentation training set is obtained.

In (b-2), the original training set generated in the step a and the mirror augmentation training set obtained in the step (b-1) are integrated together, and the Gaussian filtering is performed on the integrated training set. A size of a convolution kernel is 9*9 and a sigma value is 5. A Gaussian filtering augmentation training set is obtained.

In (b-3), the original training set generated in the step a, the mirror augmentation training set obtained in the step (b-1), and the Gaussian filtering augmentation training set obtained in the step (b-2) are integrated together to obtain a comprehensive augmentation training set.

(c) In the pre-training and training stage, images of non-face ordinary objects with multiple classifications are used as pre-training data to pre-train a multi-classification model for object detection.

The step (c) belongs to the pre-training and training stage, and is mainly intended to use an ordinary object for pre-training to improve a convergence speed of the model in the training stage.

The step (c) mainly comprises the following steps.

In (c-1), images of the non-face ordinary objects with 20 classifications are used as the pre-training data.

In (c-2), a network structure is defined, and a whole portion of the network is transplanted to the face detection network, so that network parameters obtained by pre-training are conveniently migrated to the face detection network in a migration learning manner, and then a formula (1) is used as a loss function. A function of the formula (1) is to extend two-dimensional logistic regression to multi-dimension logistic regression. Each classification has a loss value thereof in training. A pre-training data set is trained by Region-based Fully Convolutional Networks (RFCN), and the classifications are adjusted to be 21, wherein 20 classifications refer to the above ordinary objects and 1 classification refers to background.

$$L_i = -\log\left(\frac{e^{f_{y_i}}}{\sum_j e^{f_j}}\right) \quad (1)$$

(d) In the pre-training and training stage: an original network model is changed into a binary classification model, and some parameters of the binary classification model are initialized by the pre-training model in the step (c).

The step (d) belongs to the pre-training and training stage, which uses the model obtained by pre-training in the step (c) as the pre-training model, and an original classifier model is modified from 21 classifications to 2 classifications.

The step (d) mainly comprises the following steps.

In (d-1), the model obtained by pre-training in the claim 1 (c) is used to initialize some parameters of the face detection model in the migration learning manner.

In (d-2), the Region-based Fully Convolutional Networks (RFCN) are used as the main frame for training, and a classification number of the frame is modified into 2 classifications.

(e) In the pre-training and training stage, the comprehensive augmentation training set is used as an input training set to obtain a model to be used in the detection stage by training.

The step (e) belongs to the pre-training and training stage, which uses the comprehensive augmentation training set obtained in the step (b) as the input training set to obtain the model to be used in the detection stage by training, wherein the training employs an end-to-end manner, and comprises functions of candidate region extraction, face detection feature extraction and feature classification.

The step (e) mainly comprises the following steps.

In (e-1), the whole face image is used as a training image, and the training image together with a corresponding face rectangular box coordinate are used as inputs of the network.

In (e-2), the network structure is defined, and the whole network comprises a likelihood window extraction sub-network (Region Proposal Network, RPN) and a Region-based Fully Convolutional Network (RFCN). The RPN is used for extracting a face likelihood region from an image to be detected. Specifically, each location of a last convolution layer is mapped back to an original image region in a combination manner of three scales and three length-width ratios, wherein the three scale areas are respectively [128*128, 256*256, 512*512], and the three length-width ratios are respectively [1:1, 1:2, 2:1], and the image region mapped in the manner may basically cover all target regions of the original image. The RFCN is used for judging whether a candidate region provided by the RPN is a face and further adjusting a location of the face. In order to improve an operation speed and keep a high detection accuracy, the present invention uses the convolution layer as a classification layer and a coordinate regression layer instead of a full connection layer.

In (e-3), an end-to-end multi-task training manner is employed, and a Hard Example Mining manner is used to obtain a complete face detection model by training. For hard example mining, a calibration box may be marked in advance in target detection, and then a series of likelihoods are generated in an algorithm. These likelihoods may or may not intersect with the marked calibration box. The likelihoods with an Intersection over Union (IOU) greater than a certain threshold (usually 0.5) are regarded as positive samples, while the likelihoods with an IOU below the threshold are regarded as negative samples. Then the samples are thrown into the network for training. However, there may be a problem that a number of the positive samples is far less than that of the negative samples, and an effect of the trained classifier is always limited, so that there may be many false positives, among which the false positives with higher scores are regarded as hard examples. Since these hard examples are mined, these hard examples are thrown into the network for training again, thus enhancing an ability of the classifier to distinguish the false positives.

(f) In the testing stage, according to data features of a testing set, a scale of an input image is adjusted to meet requirements on accuracy, resource consumption and detection time, and testing is performed.

The step (f) belongs to the testing stage, which uses the model obtained by training in the step (e), and may balance the face detection speed, the resource consumption and the accuracy by adjusting scale parameters. When the scale is large, the face detection speed is slow, and the resource consumption is high, but the accuracy can be improved. When the scale is small, the face detection speed is high, and the resource consumption is low, but the accuracy can be reduced. A user should adjust the scale parameters according to actual detection requirements.

The step (f) mainly comprises the following steps.

In (f-1), the scale parameters are inputted during testing, which comprise a minimum scaling edge interface min_len and a maximum scaling edge interface max_len. Assuming that the original image has side lengths of W0 and H0, and the scaled image has side lengths of W1 and H1, then values of W1 and H1 are as follows:

If min_len*MAX($W_0$, $H_0$)>max_len:

$$W_1 = W_0 * \frac{\text{max\_len}}{\text{MAX}(W0, H0)} \quad \text{(Formula 2)}$$

$$H_1 = H_0 * \frac{\text{max\_len}}{\text{MAX}(W0, H0)} \quad \text{(Formula 3)}$$

Otherwise:

$$W_1 = W_0 * \frac{\text{min\_scale}}{\text{Min}(W0, H0)} \quad \text{(Formula 3)}$$

$$H_1 = H_0 * \frac{\text{min\_scale}}{\text{Min}(W0, H0)} \quad \text{(Formula 4)}$$

then: min_scale$^2$≤$W_1$*$H_1$≤max_scale$^2$, which means that the scaled image can be ensured to be scaled to a fixed area range, and a time and resource consumption can be ensured to be within a fixed range.

In (f-2), the scaled images are classified by the algorithm, and location information and classification information are outputted.

The above embodiments are the preferred embodiments of the present invention, but the embodiments of the present invention are not limited by the above embodiments. Any other changes, modifications, substitutions, combinations, and simplifications made without departing from the spirit and principle of the present invention shall be equivalent substitute modes, and shall be all included in the scope of protection of the present invention.

What is claimed is:

1. A fast side-face interference resistant face detection method, wherein the method comprises a data collection and preprocessing stage, a pre-training and training stage and a detection stage, and specific steps are as follows:
   (a) the data collection and preprocessing stage: collecting face images in a practical application scene, and calibrating the collected face images to generate an original training set;
   (b) the data collection and preprocessing stage: performing mirror symmetry and Gaussian filtering operation on the face images collected in the step (a) to generate a comprehensive augmentation training set;
   (c) the pre-training and training stage: using images of non-face ordinary objects with M classifications as data to pre-train a multi-classification model for object detection by SoftMax Loss or log-likelihood loss;
   (d) the pre-training and training stage: using model parameters obtained by training in the step (c) to initialize some parameters of a face detection model in a migration learning manner and changing an original network model into a binary classification model;
   (e) the pre-training and training stage: using the comprehensive augmentation training set obtained in the step (b) as an input training set to obtain a model to be used in the detection stage by training, wherein the training employs an end-to-end manner, and comprises functions of candidate region extraction, face detection feature extraction and feature classification; and
   (f) a testing stage: the face detection method is capable of conveniently adjusting a scale of an input image during testing to meet requirements on an accuracy, resource consumption and a detection time.

2. The fast side-face interference resistant face detection method according to claim 1, wherein the step (a) comprises the following steps:
   (a-1) using the face images collected in the step (a), and using a rectangular box to calibrate a face in the face image, wherein the rectangular box is required to go up to a highest point of a hairline on a forehead, down to a lowest point of a chin, and left and right to a cheek when calibrating; and
   (a-2) recording a location (x0, y0) of an upper left corner point of the rectangular box in the image and a width and a height (w, h) of the rectangular box, and obtaining a coordinate (x1, y1) of a lower right corner of the rectangular box, wherein x1=x0+w and y1=y0+h.

3. The fast side-face interference resistant face detection method according to claim 1, wherein the step (b) comprises the following steps:
   (b-1) performing mirror symmetry on the face image calibrated in the step (a), and setting a coordinate of an upper left corner of an originally calibrated box as (x0, y0) and a coordinate of a lower right corner of the originally calibrated box as (x1, y1), and the face image having a width of W and a height of H, then the coordinate of the upper left corner of the calibrated box subjected to the mirror symmetry is (x'0=W−x'0, y'0=y0), and the coordinate of the lower right corner of the calibrated box subjected to the mirror symmetry is (x'1=W−x'1, y'1=y0), and obtaining a mirror augmentation training set;

(b-2) performing Gaussian filtering on the mirror augmentation training set obtained in the step (b-1) to obtain a Gaussian filtering augmentation training set wherein a size of a convolution kernel is 9*9 and a sigma value is 5; and (b-3) integrating the mirror augmentation training set obtained in the step (b-1) with the Gaussian filtering augmentation training set obtained in the step (b-2), and performing data screening artificially during integrating:

A. for a single face image, using a majority voting manner on the single face image, if two people think that the single face image is a face image, keeping the single face image; otherwise, deleting the single face image; and finally, using all the kept images as the comprehensive augmentation training set; and B. for a multi-face image, if the multi-face image is considered having a face but is not marked, removing the multi-face image artificially, and finally, using all the kept images as the comprehensive augmentation training set.

4. The fast side-face interference resistant face detection method according to claim 1, wherein the step (c) comprises the following steps:

(c-1) using images of the non-face ordinary objects with 20 classifications as pre-training data;

(c-2) training a pre-training data set by ResNet-50, and adjusting the classifications from 1000 to 21, wherein 20 classifications are the non-face ordinary objects and 1 classification is a background; and (c-3) in order to fully converge the pre-training model, using a strategy of "multistep" for training, wherein a step size of a first step is 200,000, a step size of a second step is 400,000, and a total number of iterations is 800,000.

5. The fast side-face interference resistant face detection method according to claim 1, wherein the step (d) comprises the following steps:

(d-1) using the model obtained by pre-training in the step (c) to initialize some parameters of the face detection model in the migration learning manner; and (d-2) using a region-based fully convolutional network as a main frame for training, and modifying a classification number of the frame into binary classifications.

6. The fast side-face interference resistant face detection method according to claim 1, wherein the step (e) comprises the following steps:

(e-1) using the whole face image as a training image, and using the training image together with a corresponding face rectangular box coordinate as inputs of a network;

(e-2) defining a structure of the network, wherein the whole network comprises a likelihood window extraction sub-network and a region-based fully convolutional network; and (e-3) employing an end-to-end multi-task training manner, and using a hard example mining manner to obtain a complete face detection model by training.

7. The fast side-face interference resistant face detection method according to claim 6, wherein in the step (e-2), the likelihood window extraction sub-network is used for extracting a face likelihood region from an image to be detected, specifically, each location of a last convolution layer is mapped back to an original image region in a combination manner of three scales and three length-width ratios, wherein the three scale areas are respectively [128*128, 256*256, 512*512], and the three length-width ratios are respectively [1:1, 1:2, 2:1], and the image region mapped in the manner is able to cover all target regions of the original image; and the region-based fully convolutional network is used for judging whether a candidate region provided by RPN is a face and further adjusting a location of the face.

8. The fast side-face interference resistant face detection method according to claim 1, wherein the step (f) comprises the following steps:

(f-1) inputting scale parameters during testing, which comprise a minimum scaling edge interface and a maximum scaling edge interface; and (f-2) automatically scaling, by an algorithm, inputted images to a suitable size according to the inputted scale parameters, classifying the scaled inputted images, and outputting location information and classification information.

* * * * *